(12) United States Patent
Markies et al.

(10) Patent No.: US 11,427,022 B2
(45) Date of Patent: Aug. 30, 2022

(54) INK JET COATING COMPOSITION

(71) Applicant: Canon Production Printing Holding B.V., Venlo (NL)

(72) Inventors: Peter R. Markies, Venlo (NL); Jeroen A. Schell, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 5 days.

(21) Appl. No.: 16/899,674

(22) Filed: Jun. 12, 2020

(65) Prior Publication Data
US 2020/0406656 A1 Dec. 31, 2020

(30) Foreign Application Priority Data
Jun. 27, 2019 (EP) ..................... 19183039

(51) Int. Cl.
*B41M 5/00* (2006.01)
*C09D 11/03* (2014.01)
(Continued)

(52) U.S. Cl.
CPC .......... *B41M 5/0017* (2013.01); *B41J 2/2114* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/045; B41J 11/0015; B41J 11/002; B41J 2/04581; B41J 2/055; B41J 2/16538; B41J 2/14201; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001;
(Continued)

(56) References Cited

U.S. PATENT DOCUMENTS 5,264,101 A 11/1993 Demorest et al.
6,485,139 B1 * 11/2002 Lavery ..................... D06P 5/08
347/100
(Continued)

FOREIGN PATENT DOCUMENTS

JP 10-237372 A 9/1998

OTHER PUBLICATIONS

European Search Report, issued in Application No. 19 18 3039, dated Dec. 17, 2019.

*Primary Examiner* — Manish S Shah
(74) *Attorney, Agent, or Firm* — Birch, Stewart, Kolasch & Birch, LLP (57) ABSTRACT

The present invention relates to a method for applying an image onto a recording medium, using an aqueous ink jet coating, wherein the aqueous ink jet coating includes a cationic polymer and an anionic surfactant. The present invention further relates to a method for preparing such aqueous ink jet coating composition.

6 Claims, 3 Drawing Sheets

(51) Int. Cl.
  *C09D 11/106* (2014.01)
  *C09D 11/38* (2014.01)
  *B41J 2/21* (2006.01)

(52) U.S. Cl.
  CPC ............ *C09D 11/03* (2013.01); *C09D 11/106* (2013.01); *C09D 11/38* (2013.01)

(58) Field of Classification Search
  CPC ........ B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/107; C09D 11/326; B41M 5/0011; B41M 5/0017; B41M 5/0023; B41M 5/0047; B41M 7/00; B41M 7/0072; B41M 5/52; B41M 5/5218; B41M 5/5227; B41M 7/0081; B41M 3/006; B41M 3/003
  See application file for complete search history.

(56) References Cited

U.S. PATENT DOCUMENTS

| | | | | |
|---|---|---|---|---|
| 8,845,091 | B2* | 9/2014 | Ohshima | B41J 2/01 347/105 |
| 2004/0046848 | A1* | 3/2004 | Payne | C08K 5/31 347/101 |
| 2006/0181587 | A1* | 8/2006 | Bauer | C09D 11/40 347/100 |
| 2009/0114121 | A1* | 5/2009 | Morohoshi | C09D 11/40 106/31.86 |
| 2009/0291213 | A1* | 11/2009 | Ohshima | C09D 11/40 427/256 |
| 2010/0028571 | A1 | 2/2010 | Schultz et al. | |
| 2010/0215855 | A1* | 8/2010 | Morohoshi | B41M 5/502 427/256 |
| 2012/0262518 | A1* | 10/2012 | Naruse | B41J 2/2107 347/21 |
| 2013/0176369 | A1* | 7/2013 | Gotou | B41J 2/2107 347/100 |
| 2015/0035896 | A1* | 2/2015 | Gotou | B41J 2/01 347/20 |
| 2015/0103116 | A1* | 4/2015 | Gotou | B41J 2/2114 347/21 |
| 2017/0233595 | A1* | 8/2017 | Erdodi | C09D 11/328 428/201 |

* cited by examiner

INK JET COATING COMPOSITION

The present invention relates to a method for applying an image onto a recording medium, using an aqueous ink jet coating, wherein the aqueous ink jet coating comprises a cationic polymer and an anionic surfactant. The present invention further relates to a method for preparing such aqueous ink jet coating composition.

BACKGROUND OF THE INVENTION

Aqueous ink jet coating compositions are known in the art. These ink jet coating compositions comprise an aqueous medium. In addition, these compositions may comprise a polymer, such as a cationic polymer. A cationic polymer may be dissolved or dispersed in the aqueous medium. The presence of a polymer in the ink jet coating composition may increase the print quality of images formed by applying the ink jet composition onto a recording medium. The ink jet composition may be applied in several ways to the recording medium. However, the preferred way of applying ink jet ink compositions is using an ink jet device, such as an ink jet print head. An ink jet print heads ejects tiny droplets of ink through a nozzle. By applying a predetermined pattern of these tiny droplets, an image may be formed.

When using an ink jet composition comprising a cationic polymer, the jettability of the composition may not be satisfactory. The jettability of a composition is its ability to be jetted by an ink jet print head. If the jettability in insufficient, jetting of the composition using an ink jet print head may not be possible or may hardly be possible. It is preferred that a composition is well jettable.

It is therefore an object of the invention to provide an aqueous ink jet ink composition having good jettability.

SUMMARY OF THE INVENTION

The object of the invention is achieved in an aqueous ink jet coating composition, the coating composition comprising a cationic polymer and an anionic surfactant.

Aqueous Medium

The aqueous medium may comprise water. In addition, the aqueous medium may comprise one or more co-solvents. Optionally, the ink jet coating composition may comprise one or more additives.

Co-Solvents

As a co-solvent of the ink jet coating composition, for the purposes of improving the ejection property of the ink jet coating composition or adjusting its physical properties, the coating composition preferably contains a water soluble organic solvent in addition to water. As long as the effect of the present invention is not damaged, there is no restriction in particular in the type of the water soluble organic solvent. Also, more than one co-solvent can be used in the coating composition used in the present invention.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, pentaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglycerol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Additives

The ink jet coating composition may optionally further contain additives like dispersants, funghicides, anti-bacterial components, wetting agents and humectants. The additives are not particularly limited and comprise those usually used in aqueous ink jet coating compositions.

Cationic Polymer

The cationic polymer may be a polymer having a structural element carrying a positive electrical charge. The positive electrical charge may be present in the backbone of the polymer or in a side group of the polymer chain. Preferably, the positive electrical charge is present in a side group of the polymer chain. Cationic polymers are also referred to as coagulants or flocculants. The electrical charge of the cationic polymer may interact with other electrically charged components, such as latex particles and/or dispersed pigments. Examples of cationic polymers are poly(diallyldimethyl)ammonium chlorides, poly(dimethylamine-co-epichlorohydrin), cationic polyacrylamides and naturally occurring cationic polymers.

The cationic polymer may be present in an amount of less than 10 wt % based on the total weight of the coating composition. Preferably, the cationic polymer may be present in an amount of from 0.01 wt % to 5 wt % based on the total weight of the coating composition. More preferably, the cationic polymer may be present in an amount of from 0.05 wt % to 3 wt % based on the total weight of the coating composition, for example from 0.06 wt % to 1 wt %. If the amount of cationic polymer is too high, then jetting of the ink jet coating composition may be difficult. If the amount of cationic polymer is too low, then the effectiveness of the ink jet coating composition may be insufficient. If the ink jet coating composition is used as a reaction liquid, then a low amount of cationic polymer (i.e. an amount of less than 0.005 wt % based on the total weight of the coating composition) may result in insufficient interaction with another composition.

Anionic Surfactant

Surfactants are compounds that lower the surface tension between two phases (such as between two liquids or between a liquid and a solid). Surfactants may act as detergents, wetting agents, emulsifiers, foaming agents, and dispersants. Surfactants may be cationic, anionic, non-ionic or zwitterionic in nature. In the present invention, the surfactant may be anionic in nature. Anionic surfactants contain anionic functional groups at their head. Non-limiting examples of such anionic functional group are sulfate, sulfonates, sulfosuccinate, phosphates, and carboxylates functional groups. Alkyl sulfates are known surfactants. Well-known examples of alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Examples of sulfonates include docusate (dioctyl sodium sulfosuccinate), perfluorooctanesulfonate (PFOS) and perfluorobutanesulfonate. Examples of phosphates are alkyl-aryl ether phosphates and alkyl ether phosphates. Examples of sulfosuccinate are sulfosuccinate esters, such as sodium sulfosuccinate esters, for example sodium dioctyl sulfosuccinate. Examples of surfactants comprising a carboxylate functional group are carboxylate salts (soaps), such as alkali salts of fatty acids, such as sodium salts of fatty acids, for example sodium stearate.

The anionic surfactant may interact with the cationic polymer. The inventors have surprisingly found that the combination of a cationic polymer and an anionic surfactant improves the jettability of an ink jet coating composition.

The anionic surfactant may be present in an amount of from 0.01 to 3.0 molar equivalents with regard to the amount of cationic polymer, preferably in an amount 0.02 to 1.5 molar equivalents with regard to the amount of cationic polymer, for example in an amount of from 0.05-0.9 molar equivalents with regard to the amount of cationic polymer.

In an embodiment, the cationic polymer is a diallyldimethylammoniumchloride polymer. Poly(diallyldimethyl)ammoniumchloride is a suitable polymer for use in an ink jet coating composition according to the present invention. Poly(diallyldimethyl)ammoniumchloride is also referred to as pDADMAC.

In a further embodiment, the molecular weight (Mw) of the cationic polymer is in the range of 300 000 g/mole to 600 000 g/mole. When using high molecular weight pDADMAC, i.e. pDADMAC having a molecular weight (Mw) of the cationic polymer is in the range of 300 000 g/mole to 600 000 g/mole, the coating composition according to the present invention, which also comprises an anionic surfactant, may still be suitably jetted and can therefore be applied onto a recording medium using an ink jet device.

In an embodiment, the anionic surfactant is selected from at least one from the group consisting of a sulfosuccinate surfactant and an alkyl sulfate.

Sulfosuccinate surfactants and alkyl sulfate surfactants are suitable for use in an ink jet coating composition according to the present invention. Sulfosuccinate surfactants include among others sodium dioctyl sulfosuccinate. Alkyl sulfate surfactants include amongst others sodium dodecyl sulfate, which is also known as sodium lauryl sulfate.

In an embodiment, the coating composition is a reaction liquid. A reaction liquid is a composition that may trigger a reaction—such as a chemical and/or physical reaction—in another composition when in contact with that other composition. A reaction liquid is also known as primer composition. The primer composition may induce precipitation of pigment particles and optionally other stabilized particles, such as latex particles, when in contact with an ink composition comprising such particles. Preferably, the reaction liquid is applied to the recording medium before application of the ink composition. The reaction liquid may be applied in a predetermined pattern. Alternatively, a subarea of, or a complete area of the recording medium may be covered with a layer of reaction liquid. A reaction liquid comprising a cationic polymer is suitable for use as a primer composition. A reaction liquid comprising a cationic polymer may be better suited for use on non-absorbing recording media or low-absorbing media, compared to traditional reaction liquids, such as aqueous solutions comprising metal salts, for example alkali salts or alkaline earth salts. Preferably, the coating composition does not comprise a colorant, such as a pigment.

The reaction composition may be used in combination with a latex ink composition. Latex ink compositions typically comprise water, a colorant and dispersed polymer particles. Preferably, the colorant is a dispersed pigment. Often, latex ink compositions further comprise one or more solvents. In addition, latex ink compositions may comprise further additions, such as but not limited to surfactants, dispersants, funghicides, anti-bacterial components, wetting agents and humectants.

In a further embodiment, the coating composition is part of an ink set, the ink set further comprising at least one latex ink. Optionally, the ink set may comprise a plurality of latex inks, such as a Cyan, a Magenta, a Yellow and a blacK latex ink. Optionally, the ink set may further comprise additional colors of ink. Optionally, the ink set may comprise a varnish composition.

In an aspect of the invention, a method for providing an aqueous ink jet coating composition according to the invention is provided, the method comprising the steps of:
 a. providing an aqueous medium;
 b. providing a cationic polymer;
 c. providing an anionic surfactant;
 d. mixing the components.

The aqueous medium, the cationic polymer and the anionic surfactant may be provided. Optionally, additional components may be provided, for example an additional solvent. Preferably, the cationic polymer and the anionic surfactant are provided in a solution or dispersion. Optionally, a colorant may be provided. In case the colorant is a pigment, the pigment is preferably provided as dispersion. The components may be provided at once, or the components may be added subsequently. The components may be added in any suitable order. In case a dispersible component is added (e.g. a pigment), such dispersible component may be preferably added after the other components of the ink composition are provided. Mixing of the components may be carried out at any suitable temperature, for example room temperature.

In a further aspect of the invention, a method for applying an image onto a recording medium is provided, the method comprising the steps of:
 a. Applying the coating composition according to the invention onto a recording medium using an inkjet dispenser.

In the method, an image is applied onto a recording medium. In the method, in step a), an image is applied to the recording medium. The image may be applied using an ink jet coating composition according to the present invention. The ink composition may be applied onto the recording medium in a predetermined fashion, e.g. in accordance with image files stored on suitable storing means. The image may be applied for example by jetting droplets of the ink jet coating composition using an inkjet print head. The recording medium may be a sheet-like medium, such as a sheet of paper or a sheet of vinyl. Alternatively, the recording medium may be a web, for example an endless belt. The web may be made of a suitable material. Optionally, the image may be dried after it has been applied onto the intermediate transfer member.

In an embodiment, the coating composition is a reaction liquid, and the method further comprises the step of:

b. Applying an ink composition onto the recording medium.

The ink jet coating composition may be a primer composition. The primer composition may be applied onto a recording medium before an ink composition is applied on the recording medium provided with the coating composition. The components present in the coating composition may destabilize particles—such as polymer particles and/or pigment particles in the ink composition to precipitate. This may improve print quality.

The ink jet coating composition may be free of colorant. The ink jet coating composition may be applied in a predetermined pattern. The ink jet coating composition may be applied using an ink jet disperser, such as an ink jet print head, for example a piezo electric print head. Optionally, more than one ink composition may be applied. For example, differently colored ink compositions may be used. Optionally, an overcoat may be applied after applying the ink composition.

BRIEF DESCRIPTION OF THE DRAWINGS

The present invention will become more fully understood from the detailed description given herein below and accompanying schematical drawings which are given by way of illustration only and are not limitative of the invention, and wherein.

In the drawings, same reference numerals refer to same elements.

DETAILED DESCRIPTION OF THE DRAWINGS

Figure 1:
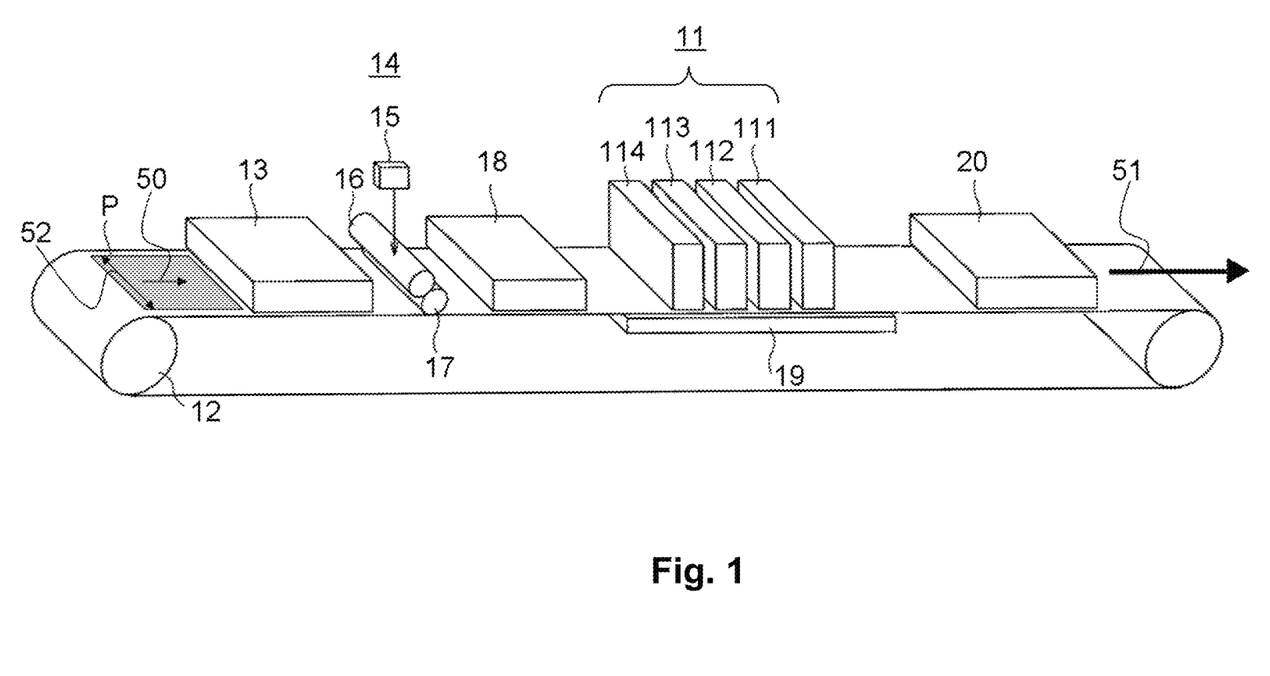
FIG. 1 shows a schematic representation of an inkjet printing system.
Figure 2A:
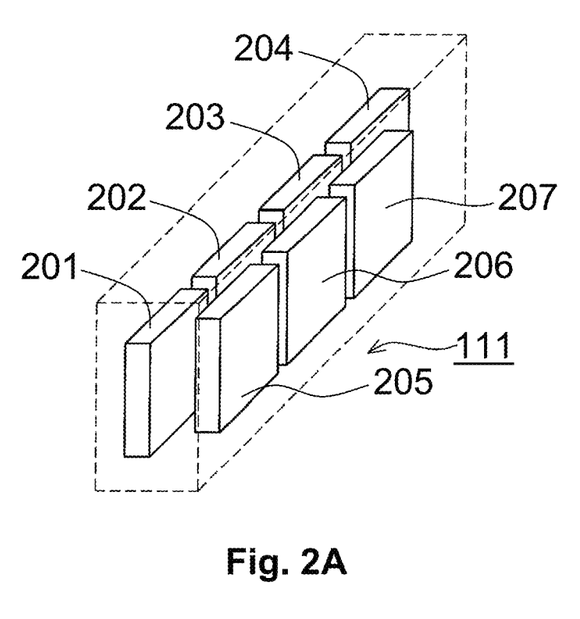
FIGS. 2A-2C show a schematic representation of an inkjet marking device: A) and B) assembly of inkjet heads; C) detailed view of a part of the assembly of inkjet heads.
Figure 2B:
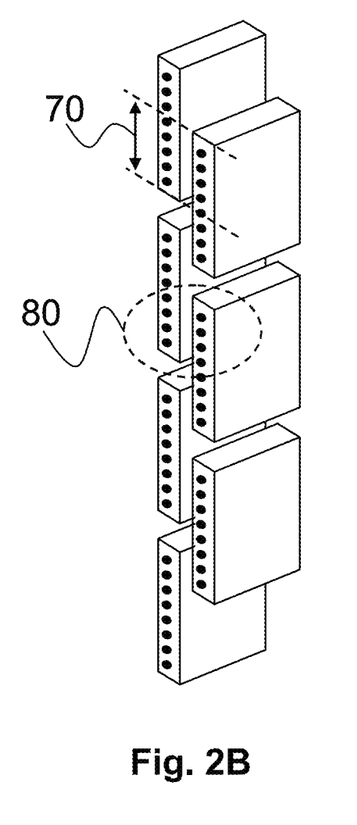
Figure 2C:
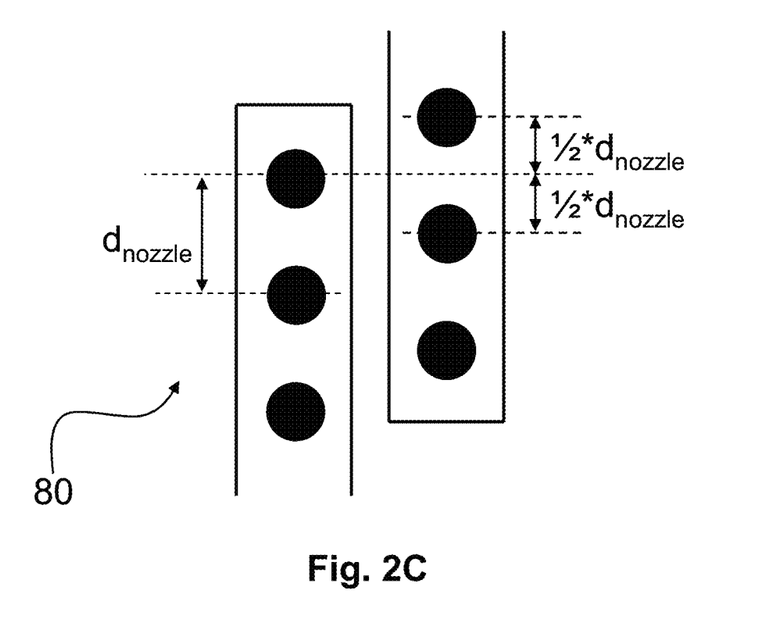

An exemplary printing process in an ink-jet printing apparatus of the present invention will now be described with reference to the appended drawings shown in FIG. 1 and FIG. 2. FIGS. 1 and 2 show schematic representations of an inkjet printing system and an inkjet marking device, respectively. However, the present ink-jet printing process and ink-jet printing apparatus are not limited to this exemplary embodiment.

FIG. 1 shows that a sheet of a recording medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises the following steps: media pre-treatment, image formation, drying and fixing and optionally post treatment.

Media Pre-Treatment

To improve the spreading and pinning (i.e. fixation of pigments and water-dispersed polymer particles) of the ink on the recording medium, in particular on slow absorbing media, such as machine coated media, the recording medium is pre-treated, i.e. treated prior to printing an image on the medium. The pre-treatment step comprises the application of the pre-treatment liquid of the present invention and may further comprise one or more of the following:

preheating of the receiving medium to enhance spreading of the used ink on the receiving medium and/or to enhance absorption of the used ink into the receiving medium;

corona or plasma treatment.

Primer Pre-Treatment

As an application way of the pre-treatment liquid, any conventionally known methods can be used. Specific examples of an application way include: an ink-jet application, a roller coating, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

As an application area of the pre-treatment liquid, it may be possible to apply only to the printed portion, or to the entire surface of both the printed portion and the non-printed portion. The pre-treatment liquid may be an aqueous pre-treatment liquid.

Corona or Plasma Treatment

Corona or plasma treatment may be used as a pre-treatment step by exposing a sheet of a recording medium to corona discharge or plasma treatment. In particular when used on media like polyethylene (PE) films, polypropylene (PP) films, polyetyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbon dioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Subsequently, a predetermined quantity of the present pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the recording medium P. Alternatively, the pre-treatment liquid can also be applied by one or more print heads. Subsequently, the coated printing paper P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a recording medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the recording medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the recording medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected recording medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Hitherto, the printing process was described such that the image formation step was performed in-line with the pre-treatment step (at least application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image, and the step or drying an fixing the printed image are performed. It is, however, preferable to carry out image formation with the above defined in-line image forming method.

In a further aspect, the present invention relates to a method of pre-treating a recording medium comprising pre-treating a recording medium with the pre-treatment liquid of the invention, e.g. as described with regard to the printing process.

Experiments and Examples

Materials

SDS (sodium dodecyl sulfate) was obtained from Sigma Aldrich. Poly(diallyldimethylammonium chloride) (pDADMAC) solutions were obtained from Sigma Aldrich: A 35 wt % solution in water of pDADMAC having an average Mw of less than 100,000 g/mole (order number 522376 Jun. 14, 2019) and a 20 wt % solution in water of pDADMAC having an average Mw in the range of from 400,000 to 500,000 g/mole (order number 409030 Jun. 14, 2019). Water was purified by ion exchange.

All chemicals, except water, were used as received.

Methods

Viscosity

Viscosity was determined using an Antor Paar MCR302 Rheometer having a flat plate geometry at a temperature of 25° C. The shear velocity was increased from 0 to 1000 at 1/sec. Shear stress ($\tau$) was measured as a function of the shear velocity and the viscosity was calculated from the relation between the shear velocity and the shear stress.

Dispersabilty Experiments

Dispersability experiments were performed by dropwise adding a surfactant solution to a 1 wt % solution of pDADMAC in demineralized water. The visual appearance of the resulting mixture was checked. If the resulting mixture had a milky-like appearance, it was concluded that a dispersion had formed. If the resulting mixture had a clear appearance, it was concluded that the resulting mixture was a solution.

Comparison Experiment 1

A 1 wt % solution of pDADMAC in demineralized water was prepared by diluting a 35 wt % solution in water of pDADMAC having an average Mw of less than 100,000 g/mole by adding demineralized water. The resulting pDADMAC solution is an example not in accordance with the present invention and is referred to as CE 1.

A 1 wt % dispersion of pDADMAC-SDS complex was prepared by adding dropwise 0.8 equimolar aqueous SDS solution to CE 1. The resulting pDADMAC-SDS dispersion is an example in accordance with the present invention and is referred to as Ex 1.

The viscosities of both CE 1 and Ex 1 were determined and presented in table 1.

TABLE 1

| mixture | viscosity [mPa s] |
|---------|-------------------|
| Ex 1    | 2.0               |
| CE 1    | 4.1               |

The viscosity of the dispersion according to the invention Ex 1 is lower than the viscosity of solution not according to the invention CE 1. Fluids having a low viscosity have a better jettability than fluids having a higher viscosity. Therefore, the fluid according to the invention Ex 1 has improved jettability.

Comparison Experiment 2

A 0.2 wt % solution of pDADMAC in demineralized water was prepared by diluting a 20 wt % solution in water of pDADMAC having an average Mw in the range of from 400,000 to 500,000 g/mole by adding demineralized water. The resulting pDADMAC solution is an example not in accordance with the present invention and is referred to as CE 2. 0.2 wt % dispersions of pDADMAC-SDS complex was prepared by adding dropwise an aqueous SDS solution to CE 1, the SDS solution comprising 10 wt % of SDS. The amount of SDS complex was varied such that the number of equivalents of SDS versus pDADMAC varied from 0.05 to 0.8. The resulting pDADMAC-SDS dispersions are an example in accordance with the present invention and are referred to as Ex 2-Ex 8. The viscosities of the compositions were determined and are summarized in table 2.

TABLE 2

| mixture | equivalents of SDS | viscosity [mPa s] |
|---------|--------------------|--------------------|
| CE 2    | 0                  | 3.5               |
| Ex 2    | 0.06               | 3.4               |
| Ex 3    | 0.10               | 2.8               |
| Ex 4    | 0.20               | 2.3               |
| Ex 5    | 0.30               | 1.9               |
| Ex 6    | 0.40               | 1.6               |
| Ex 7    | 0.50               | 1.4               |
| Ex 8    | 0.8                | 1.4               |

From table 2, it can be concluded that adding SDS (which is an anionic surfactant) to the pDADMAC solution decreased the viscosity of the fluid. Lowering the viscosity improves the jettability of the fluid.

Thus, fluids Ex 2-Ex 8 have a lower viscosity, corresponding to an improved jettability compared to fluid CE 2, which is a fluid not in accordance with the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for applying an image onto a recording medium, the method comprising:
   a. applying a coating of a primer composition onto a recording medium using an inkjet dispenser, wherein the primer composition comprises a dispersed cationic polymer and an anionic surfactant,
   wherein the dispersed cationic polymer is a diallyldimethylammoniumchloride polymer,
   b. applying an ink composition onto the recording medium in a predetermined pattern to form an image on the recording medium, and
   c. drying the ink composition applied onto the recording medium.

2. The method according to claim 1, wherein the primer composition is a reaction liquid, and
   wherein the ink composition comprises a colorant.

3. The method composition according to claim 1, wherein a molecular weight (Mw) of the dispersed cationic polymer is in the range of 300,000 g/mole to 600,000 g/mole.

4. The method according to claim 1, wherein the anionic surfactant is at least one selected from the group consisting of a sulfosuccinate surfactant and an alkyl sulfate.

5. A method for preparing an aqueous ink jet primer composition comprising a dispersed cationic polymer, the method comprising:
   a. providing an aqueous medium;
   b. providing a cationic polymer, which is a diallyldimethylammoniumchloride polymer;
   c. providing an anionic surfactant; and
   d. mixing the aqueous medium, the cationic polymer and the anionic surfactant.

6. A method for applying an image onto a recording medium, the method comprising:
   a. applying a coating of a reaction liquid onto a recording medium using an inkjet dispenser, wherein the reaction liquid comprises a dispersed cationic polymer and an anionic surfactant,
   wherein the dispersed cationic polymer is a diallyldimethylammoniumchloride polymer;
   b. applying an ink composition onto the recording medium provided with the reaction liquid in a predetermined pattern to form an image on the recording medium, wherein the ink composition is an aqueous ink composition comprising a colorant and further comprising dispersed polymer particles; and
   c. drying the ink composition applied onto the recording medium.

* * * * *